United States Patent Office 3,348,611
Patented Oct. 24, 1967

3,348,611
SURFACTANTS FOR OIL RECOVERY BY
WATERFLOODS
Joseph Reisberg, Houston, Tex., assignor to Shell Oil
Company, New York, N.Y., a corporation of Delaware
No Drawing. Filed July 9, 1965, Ser. No. 470,925
18 Claims. (Cl. 166—9)

ABSTRACT OF THE DISCLOSURE

An improved method for oil recovery by injecting into the waterflood a small amount of a composition comprising of a mixture containing an oil-soluble high molecular weight alkyl aryl sulfonate and a water-soluble lower molecular weight alkyl aryl sulfonate, the latter sulfonate being present in at least the critical micelle concentrations and to effectively solubilize the former sulfonate, and optionally adding an electrolyte to the composition when necessary.

---

This application is a continuation-in-part of copending patent application Ser. No. 359,405, filed Apr. 13, 1964.

This invention relates to the displacement of oil from the pores of subterranean, oil-containing reservoirs, and more particularly to special surface active systems to be used with "waterflooding" techniques to improve the oil displacement efficiency of waterfloods.

Knowledge is wide spread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary recovery" techniques which have as their primary purpose the economical recovery of additional quantities of the residual oil known to be present in the reservoir.

Probably, one of the more common secondary recovery techniques is the so-called "waterflooding" in which aqueous fluids are injected at one point in the reservoir at pressures sufficient to be forced out into the reservoir and toward a spaced production well or wells, thereby, in effect, displacing it from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within the pores of the rock formations by capillarity merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering oil. In many such prior systems the interfacial tension between the oil and water is reduced from a characteristic value in the order of 50 dynes per centimeter to a value of from about 1 to 10 dynes per centimeter. If the interfacial tension is reduced to only about 10 dynes per centimeter, the increase in the amount of oil that can be recovered is not generally significant. Thus, the cost of obtaining the reduction in the interfacial tension is apt to be more than the value of the increased amount of oil that is recovered in many cases.

Broadly, the objects of this invention can be ascertained from the specific description thereof and are achieved by incorporation, into at least the initial portion of a waterflood, a small amount of a composition containing both high molecular weight alkyl aryl sulfonates which are generally water insoluble and lower molecular weight alkyl aryl sulfonates which are generally water soluble which results in a stable, aqueous dispersed system of the sulfonates which greatly enhances the ability of the system to displace oil from reservoirs. Also, the invention encompasses the use of electrolytes with the aqueous, dispersed system prepared according to this invention which when present in certain concentration ranges, effects a substantial reduction of interfacial tension between the system and hydrocarbons found in oil reservoirs.

More specifically, the present invention involves the use of waterflooding operations which provides an aqueous surfactant system comprising an aqueous liquid dispersion of a composition of alkyl aryl sulfonates in which at least one surface active alkyl aryl sulfonate that is water soluble and is present in an amount exceeding its critical micelle concentration in the aqueous liquid is mixed with at least one surface active alkyl aryl sulfonate that is relatively water insoluble. Such an aqueous liquid dispersion can be formed by mixing an aqueous liquid with (a) both a water soluble surface active organic sulfonate and a relatively water insoluble surface active organic sulfonate, or alternatively (b) natural petroleum sulfonates that contain both water soluble and relatively water insoluble organic sulfonates in the necessary proportions. The procedure (b) is particularly preferred since it comprises mixing the aqueous liquid with a low cost commercially available mixture of sulfonates such as mahogany sulfonates described later. For purposes of description, a water soluble surface active alkyl aryl sulfonate is a monosulfonate which, in the form of its sodium salt, has a molecular weight of from about 300 to 400 or is a polysulfonate. A relatively water insoluble surface active alkyl aryl sulfonate in one which, in the form of its sodium salt, has a molecular weight of more than about 500. In the present process the particularly suitable sulfonates are the mahogany sulfonates which are mixtures having average molecular weights of from about 400 to 500. Such mahogany sulfonates contain both water soluble and relatively water insoluble alkyl aryl sulfonates.

In an especially preferred embodiment of this invention, an electrolyte is added to the aqueous liquid that contains the dispersion of the organic sulfonates and is adjusted to a concentration which causes the interfacial tension between the aqueous dispersion and the oil to be significantly less than 1 dyne per centimeter, and preferably less than about 0.01 dyne per centimeter at the temperature at which the oil is to be displaced by the aqueous dispersion (reservoir temperature). Such a low interfacial tension results from a combination of (a) a low molecular weight, water soluble sulfonate (association colloid) at a concentration exceeding its CMC; (b) a high molecular weight polar (amphiphilic) sulfonate; and (c) an electrolyte concentration that is substantially optimum for the temperature and the composition of the sulfonate and water composition of the system. The concentration at which a given electrolyte should be employed in a given aqueous dispersion of the present invention is generally between about 0.1 to 0.7 molar. The concentration that is substantially optimum can readily be determined by simple laboratory tests such as varying the electrolyte concentration and measuring the resultant interfacial tensions by means of interfacial tension measuring procedures known to those skilled in the art, or varying the electrolyte concentration and measuring the resultant displacement efficiencies by means of fluid displacement tests in sand packs or cores. In general, the optimum salt concentration is particularly dependent upon the temperature and the molecular weight of the organic materials; it tends to decrease with increases in the molecular weights of the surfactants.

The mechanism by which the generally water-insoluble alkyl aryl sulfonates are solubilized in aqueous solutions according to this invention, is probably through micelles. The formation of micelles is well-known in the colloid art. Micelles are formed when the concentration of an association colloid in an aqueous liquid is increased above a certain critical concentration. Above such concentrations the ions or molecules thereof aggregate to form larger particles known as micelles. The concentration at which the micelles form is known as the "critical micelle concentration," often abbreviated "CMC" and varies from compound to compound.

A possible explanation for the very low interfacial tension between the water and oil when the waterflood contains the mixture of surfactants that is present in the compositions of the present invention may result from the formation of expanded water soluble alkyl aryl sulfonate micelles that are expanded by the inclusion of the relatively water-insoluble alkyl aryl sulfonates. Since, in the practice of this invention, it is necessary that the water soluble alkyl aryl sulfonates be present in at least their critical micelle concentration, CMC, it is apparent that micelles exit in the aqueous solution. The relatively insoluble alkyl aryl sulfonates apparently combine or couple with these micelles in a manner such that they become affiliated with or included within the micelles. Possibly, the insoluble alkyl aryl sulfonate molecules will actually penetrate into the micelles and cause them to swell to larger sized micelles. Relative to the individual behaviors of either the relatively water soluble or insoluble alkyl aryl sulfonates, an additional phenomenon was discovered. This phenomenon was the effect of using a mixture of the water soluble and generally low molecular weight alkyl aryl sulfonates with the relatively water insoluble and generally high molecular weight alkyl aryl sulfonates as opposed to a single compound of either type. The mixtures of these water soluble and water insoluble alkyl aryl sulfonates appear to be more effective than a single species having a molecular weight approximating that of the average molecular weight of the mixture. The use of this combination of generally water-soluble sulfonates with generally water insoluble sulfonates in aqueous flooding mediums provides an oil displacement capability that is greater than either the two molecular weight sulfonates used separately. Further, generally water-insoluble sulfonates are the least effective alone since their concentration in an aqueous medium is very limited because of their limited solubility.

While the mixtures of such generally high and low molecular weight alkyl aryl sulfonates increase the efficiency of waterfloods containing the same, a further rather sharp increase in efficiency is acheived by adding an electrolyte to the aqueous system containing the mixture of the relatively water soluble and water insoluble alkyl aryl sulfonates. This increase in efficiency occurs when the electrolyte is added to an aqueous system containing the mixed relatively soluble and insoluble alkyl aryl sulfonates but does not occur to a significant extent when the system contains an equal amount of either type of sulfonate in the absence of the other. Generally, when an electrolyte is added to the system, an accompanying increase in the size of the micelles results from association of groups of micelles into larger aggregates. However, this association can be carried too far by increasing the electrolyte concentration beyond a point at which phase separation (coacervation) occurs, with one phase being highly rich in sulfactant while the other is substantially devoid of the surfactant. Within certain electrolyte concentrations, a rather sharp decrease in the interfacial tension between the interface of the waterflood and the reservoir hydrocarbons is experienced and this decrease can reduce the interfacial tensions to values as low as about 0.001 dyne per centimeter. At these low interfacial tensions, capillarity is negligible and the hydrocarbons in the reservoir are readily displaced in the form of an oil bank by the waterflooding medium modified according to this invention.

The above possible mechanism should not be confused with a common practice of adding "inorganic builders" to surfactants in preparing commercial household detergents and the like. In respect to builders used with commercial detergents, the CMC is lowered and the interfacial tension is reduced by the builder to a range suitable for detergency or similar application to somewhere in the neighborhood of 1 to 5 dynes per centimeter. However, in the case of the instant invention, when an electrolyte with compositions of high and low molecular weight alkyl aryl sulfonates (solubilized sulfonates) is used, it will cause a significant and much more substantial change in interfacial tensions.

The mixtures of the alkyl aryl sulfonates, i.e., the water soluble and the water insoluble alkyl aryl sulfonates, which may contain mixtures of souble and insoluble entities, form substantially solubilized systems when mixed with 9 or more parts of water by weight. The total amount of alkyl aryl sulfonate in the water is usually far less than 10% by weight and it was found by actual investigation that when the aqueous medium used for waterflooding contains from 0.1 to 5% by weight of the solubilized sulfonates, excellent results are achieved. As pointed out, the soluble alkyl aryl sulfonates (low molecular weight sulfonates) must be present in at least the critical micelle concentrations in order to provide the micelles which will solubilize the high molecular weight alkyl aryl sufonates (water insoluble sulfonates). When the water soluble alkyl aryl sulfonates are present in concentrations above the CMC in the aqueous medium micelles will be formed and water insoluble alkyl aryl sulfonates, which will be referred to as amphiphilic molecules, can penetrate into the oriented aplisade layers of the micelles causing them to swell or expand. The solubilized system prepared according to the practice of this invention are frequently optically clear and are often referred to as micro emulsions; but it is not intended that those solubilized systems in which there is some turbidity, and yet substantially single phase, be excluded.

Having described the invention generally, discussion of specific components which can be used in the practice of the invention will be undertaken. Specifically, the water soluble alkyl aryl sulfonates which are used in concentrations at least equal to their critical micelle concentration encompass a wide variety of sulface active alkyl aryl sulfonates, the most common of which are the alkyl sodium benzene sulfonates having molecular weights of less than 400. These types of compounds are often classified as sulfonated water soluble syndets and are described under the classification of detergent compounds in "Industrial Detergency" by William Niven, Jr., Rhinehold Publishing Company, N.Y., 1955 and "Surface Active Agents and Detergents" by A. M. Schwartz, J. W. Perry and J. Berch, Interscience Publishers, Inc., 1958. The alkali metal salts of the alkyl aryl sulfonates exhibit a significant degree of water solubility and when the alkyl substituent is small or contains more than one sulfonic acid group, they are highly water soluble. A single species alkyl aryl sulfonate can be used or mixtures of soluble alkyl aryl sufonates can be used to achieve the micelle the oil is displaced by contacting it with a waterflood having, in at least its frontal portion, the unique surfactant combination of this invention. As known to those skilled in the art, depending upon the length of the drive and other factors of the oil production situation, where a slug of the substantially solubilized aqueous system is followed by plain waterflood liquid having a different composition, the size of the slug should amount to in the order of from about 5 to 30 percent of the pore volume of the reservoir formation from which the oil is to be displaced.

As known to those skilled in the art, it is sometimes desirable to incorporate one or more viscosity enhancing materials into such a waterflood and this technique can be used with this invention. One advantage of the present solubilized aqueous system as an interfacial tension-reducing fluid is that its pH is generally, or can readily be, rendered substantially neutral. This allows the present invention, if desired, to be used as the frontal portion of waterfloods containing a viscosity enhancing material, such as carboxy-methylated cellulose, partially hydrolyzed acryl amide polymers and the like types of colloidal materials that are subject to being precipitated or undergoing an alteration in their viscosity when subjected to changes in pH. The viscosity increaser is preferably incorporated in the water behind a slug that contains the surfactants.

*Example I.—Effect of electrolyte concentration*

A substantially solubilized aqueous system was prepared by mixing 9.5 parts by weight of water with each 0.5 part of a mixture of sodium salts of natural petroleum sulfonates having an average molecular weight of 430, and containing about 38% mineral oil (Bryton 430 sodium sulfonates). Sodium chloride was dissolved in portions of the resulting substantially solubilized aqueous system in the concentrations indicated in Table I under sodium chloride concentration.

The capability of this aqueous liquid to displace oil from an oil sand was tested in sand-packed tubes which had inner diameters of one inch, lengths of 12 inches and were packed with 150/200 mesh Ottawa sand to provide permeabilities of about four darcies. In preparation, the sand-packed tubes were saturated with water, flooded with a crude oil having a viscosity of 2.1 centipoises at 70° C. and then waterflooded with fresh water at 70° C., at an injection rate of one foot per day, to the fresh water residual oil saturation, indicated in Table I under Residual Oil Saturation. In each test, a sand pack was flooded at 70° C. with one pore volume of the substantially solubilized liquid system containing the indicated concentration of sodium chloride at a rate of about one foot per day. The amounts of oil remaining after the flooding and the amounts of oil recovered by the flooding were determined and are indicated under, respectively, Final Oil Saturation and Oil Recovered, in Table I.

TABLE I

| NaCl Concentration (Molar) | Residual Oil Saturation (Percent Pore Volume) | Final Oil Saturation (Percent Pore Volume) | Oil Recovered (Percent of Initial Amount of Oil) |
|---|---|---|---|
| 0 | 26.5 | 25.5 | 3.8 |
| 0.1 | 24.0 | 23.0 | 4.2 |
| 0.3 | 24.8 | 2.0 | 92.0 |
| 0.5 | 23.0 | 16.0 | 21.7 |
| 0.7 and above | Phase separation occurred, not injected | | |

The additional amount of oil displaced was significant for particular salt concentrations and when the aqueous system contained 0.3 moles of sodium chloride, it exhibited an interfacial tension below 0.001 dyne per centimeter against the oil to be displaced at the temperature indicated. This provided a recovery of 92 percent of the amount of residual oil saturation in the sand after the flooding with fresh water. This oil was recovered in the form of an oil bank, as distinguished from a finely dispersed emulsion or solubilized system such as are often produced in surfactant aided waterflooding processes.

It should be noted that the substantially solubilized liquid system containing 0.3 molar sodium chloride comprises an aqueous liquid that contains only about 3 percent by weight of the mixture of high and low molecular weight sulfonates (due to the presence of about 40 percent of oil in which the sulfonates were dispersed), and the sulfonates used were a relatively inexpensive surfactant material.

*Example II.—Effect of electrolyte on a conventional surfactant composition*

An aqueous liquid containing a widely used organic sulfonate syndet was prepared by mixing 9.5 parts by weight of water with each 0.5 part of sodium dodecyl benzene sulfonate. Sodium chloride was dissolved in the resulting aqueous liquid in the concentrations indicated in Table II.

The capability of these aqueous liquids to displace oil from an oil containing sand was tested in the manner described in Example I. The results of the tests are recorded in Table II.

TABLE II

| NaCl Concentration (Molar) | Residual Oil Saturation (Percent Pore Volume) | Final Oil Saturation (Percent Pore Volume) | Oil Recovered (Percent of Initial Amount of Oil) |
|---|---|---|---|
| 0 | 23.5 | 22.5 | 4.3 |
| 0.3 | 26.0 | 24.0 | 7.7 |

It is apparent that the aqueous liquid dispersion of this organic surfactant and the electrolyte used in Example II failed to provide an oil recovery that was significantly greater than that obtained by the waterflooding without the electrolyte.

The above results show that the additions of electrolytes to conventional surfactants do not provide oil recoveries comparable to those provided by the mixed alkyl aryl sulfonates of this invention.

*Example III.—Effectiveness of slugs of substantially solubilized liquid systems (SSLS)*

The capability of the substantially solubilized aqueous system containing 0.3 molar sodium chloride of the type described in Example I to displace oil when a slug of such a system is disposed ahead of a volume of fresh water was tested in sand-pack displacement tests similar to those described in Example I. In these tests, the sizes of the slugs (in terms of percent pore volume) of substantially solubilized aqueous system are indicated under SSLS (Slug Size) in Table III. The final oil saturations and amounts of oil recovered which are indicated under Final Oil Saturation and Oil Recovery in Table III are the respective values obtained after the injection of two pore volumes of an aqueous system, the frontal portion of which is the slug of substantially solubilized aqueous system and the remainder is plain water.

TABLE III

| SSLS Slug Size (Percent Pore Volume) | Residual Oil Saturation (Percent Pore Volume) | Final Oil Saturation (Percent Pore Volume) | Oil Recovered (Percent of Initial Amount of Oil) |
|---|---|---|---|
| 130 | 24.75 | 1.25 | 95.0 |
| 50 | 20.5 | 1.75 | 91.4 |
| 20 | 24.0 | 2.3 | 90.0 |

It is apparent that the present, substantially solubilized, aqueous systems are extremely efficient when employed as the frontal portion of waterfloods.

formation and it is only necessary that these water soluble sulfonates be present in concentrations that are at least equal to their aqueous critical micelle concentration. Of course, their actual concentration in the aqueous medium will vary relative to the particular sulfonate being employed, temperature, etc. When mixtures of these compounds are used, the CMC can be determined experimentally. Water soluble sulfonates may be obtained by a chemical synthesis or by sulfonation of certain petroleum fractions.

The choice of the water insoluble alkyl aryl sulfonates useful in the practice of this invention is somewhat more limited in that they usually contain only one sulfonic acid group attached to a mono-aryl alkyl aryl hydrocarbon group. More specifically, the "water insoluble" alkyl aryl sulfonates are those which in the form of their sodium salts have a molecular weight of at least about 500 and have relatively little or no water solubility. However, water solubility is relative and at high temperatures, these water insoluble alkyl aryl sulfonates have greater solubility but it is felt that the above designation is appropriate for the present purposes. Of course, when these high molecular weight alkyl aryl sulfonates are obtained from sulfonation of naturally occurring petroleum products, they contain some of the low, more water soluble alkyl aryl sulfonates. So the terminology is not 100% accurate.

A readily available source of alkyl aryl sulfonates is the natural petroleum sulfonates that are produced by sulfonating substantially constant boiling mixtures of petroleum hydrocarbons obtained as refinery fractions. On sulfonation mixtures of alkyl aryl mono-sulfonates are produced which in the form of their sodium salts have averaged molecular weights from about 400 to 500. The term "natural petroleum sulfonates" is a commercial designation of petroleum sulfonates which are obtained by a treatment of petroleum fractions, particularly solvent treated aromatic fractions with sulfuric acid, fuming sulfuric acid or sulfur trioxide. Upon sulfonation, two types of general products are formed which are designated as the mahogany sulfonates, or oil soluble (water insoluble) sulfonates, and as the green sulfonates, or water soluble sulfonates or acid sludge sulfonates. The terminology is based on the colors imparted, the brownish color imparted by the sulfonates which remained in the oil and the greenish color imparted to water solutions made from the acid sludges formed in the sulfonation process.

The mahogany sulfonates are alkyl aryl sulfonates which usually contain only one aromatic ring structure per molecule and both green and the mahogany types contain mixtures of sulfonates of varying molecular weights with the mahogany sulfonates, or oil soluble sulfonates, generally containing the sulfonates of higher molecular weights. The green sulfonates, or water soluble sulfonates, contain the sulfonates of lower molecular weight or those containing more than one sulfonate group per molecule. In such sulfonation processes, there is not a perfect separation of the high and low molecular weight sulfonates from one another and the unpurified mahogany sulfonates which are not further refined often contain some water soluble petroleum sulfonates. In fact, in many cases, the sulfonated petroleum fractions from commercial refineries (which are oil soluble and referred to as the mahogany sulfonates) often contain sufficient water soluble sulfonates to effect micelle formation in an aqueous medium having 0.1 to 5% by weight of the mahogany sulfonates dispersed therein.

Another source of high molecular weight sulfonates useful in the practice of this invention are oil soluble synthetic sulfonates. These products have oil solubility properties similar to those of high molecular weight petroleum sulfonates, but have a narrow molecular weight range spectrum which accounts for certain functional differences in their surfactant activity. These alkyl aryl sulfonates are often available commercially as byproducts of sulfonating materials such as alkylate bottoms from the manufacturers of household detergents. Their narrow molecular weight range, i.e., lesser diversity in organic entities, distinguishes them from the alkyl aryl sulfonates obtained by sulfonating the broader hydrocarbon fractions. While the natural petroleum sulfonates are more preferred, it is possible to blend the synthetic sulfonates so as to achieve a wider molecular weight distribution and thereby improve their effectiveness when used in the practice of this invention.

The influence of the temperature on the optimum electrolyte concentration for various mahogany sulfonates of different molecular weights is shown in the following table. In each case, the electrolyte was sodium chloride and the surfactants used were the sodium salts of commercially available natural petroleum sulfonates having the indicated average molecular weights. It should be noted that such sulfonates vary from batch to batch, since the spreads and groupings of the components of differing molecular weights differ from one batch to another. In each case, the "optimum salt concentration" was one which resulted in an interfacial tension between the aqueous dispersion and the oil of less than 0.01 dyne per centimeter.

| Average Molecular Weights of Sample | Optimum Salt Concentration (M) | |
|---|---|---|
| | 23° C. | 70° C. |
| 430 | 0.05-0.3 | 0.2-0.6 |
| 445 | 0.1 -0.2 | 0.2-0.3 |
| 465 | 0.1 -0.2 | 0.2-0.25 |
| 470 | 0.05-0.1 | 0.05-0.2 |
| 500 | Sample is too $H_2O$ insoluble, there are insufficient low molecular weight surfactants present to solubilize the high molecular weight material. | |

In summary, the invention requires that a water soluble alkyl aryl sulfonate be present at least in the initial portion of the waterflood in a concentration at least equal to the CMC and that water insoluble alkyl aryl sulfonates, generally having molecular weights above 400, be incorporated in such a system. Additionally, it was found that if the portion of the waterflood containing the high and low molecular weight sulfonates (the solubilized sulfonates) also contained an electrolyte in effective concentrations, the oil displacement efficiency was substantially improved. With effective electrolyte concentrations in the aqueous system, the surfactant composition of this invention is capable of reducing the interfacial tension between the oil and water interface through well below 0.1 dyne per centimeter achieving a tremendous improvement in the water's ability to displace hydrocarbons. While it is generally preferred that an electrolytic salt, such as sodium chloride, be added to the aqueous system, other materials also may be used such as inorganic water soluble acids and bases which are inert to the alkyl aryl sulfonate complexes. Probably the most preferred are the halide salts of the alkali metals in concentrations from about 0.1 to about 0.6 mole per liter, especially when the mahogany sulfonates are employed.

The aqueous dispersions of the compositions of this invention are generally used as the frontal portion of a waterflood by injecting a slug of the dispersion into the reservoir ahead of the flood water. Since the components are low-cost materials, in numerous oil displacing and/or oil producing operations, it may be desirable to employ such a dispersion as the total, as well as the frontal, portion of the waterflood. In such an operation, the oil is displaced by forcing water containing the unique surfactant combination into positions initially occupied by the oil. In other oil recovery operations, particularly when a relatively large volume of fluid permeable reservoir formation extends between the widely-spaced wells, a slug of water containing the present composition may be followed by a waterflood containing little or no surfactant, in order to economize. In either type of procedure,

Example IV.—Effectiveness of substantially solubilized liquid systems in natural earth formations The capabilities of such systems to displace oil contained in natural earth formations were tested in a core sample of a natural sandstone formation. This core had a diameter of 2 inches, was 10 inches long and had a permeability of 103 md. and a porosity of 19.0 percent. It was flooded with a crude oil having a viscosity of about 3 cp. at 95° F. and then was flooded with aqueous 0.17 N NaCl injected at a rate equaling about 0.87 foot per day at 95° F. to a residual oil saturation of 38.5% of the pore volume. The injection of one pore volume of the substantially solubilized aqueous system that contained 0.3 molar sodium chloride (as described in Example I) at the above injection rate and temperature reduced the residual oil saturation to 8.5 percent pore volume, a recovery of 78 percent of the residual oil.

When using the natural petroleum sulfonates, i.e., the mahogany sulfonates, they are often obtained from commercial sources in an oil stock containing 62% by weight of the sulfonates. This mixture can be used directly to prepare the solubilized aqueous system and the presence of the oil stock, which becomes solubilized into the aqueous system, may be beneficial to the results achieved.

Some additional tests of high and low molecular weight sulfonates used in combination with electrolytes appear in Tables IV and V below which show the actual amounts of each in percents by weight in aqueous dispersions in which the total sulfonate concentrations were approximately 5% by weight. For convenience, a legend is used to designate the various alkyl aryl sulfonates as to whether they are high molecular weight or low molecular weight and/or are natural petroleum sulfonates or synthetic sulfonates. In addition, two commercially available mahogany sulfonates, N430 from Bryton Chemical Company and N470 from Shell Oil Company, are included in the table since they each contain sufficient low molecular weight sulfonate to cause the formation of micelles when added to an aqueous system in the specified proportions. It should be obvious from the Table V that the optimum electrolyte concentrations will vary from composition to composition and this can be determined experimentally. In the tables:

N=Natural  H=High molecular weight
S=Synthetic  L=Low molecular weight

TABLE IV

| Chemical Classification | Molecular Weight | Source |
| --- | --- | --- |
| LN | 380 | Shell Oil Co. |
| LS | 348 | American Alcolac Corp. |
| HN | 540 | Shell Oil Co. |
| HS | 475 | Mineral Oil Refining Co. |
| N(430) | 435 | Bryton Chemical Co. |
| N(470) | 470 | Shell Oil Co. |

TABLE V

| Chemical Classification | Sulfonate Conc. in Percent by Weight | | NaCl (M) | Residual Oil Sat., Percent of Pore Volume | Oil Sat. (Percent Pore Vol.) after Specified Flood Volume | | |
| --- | --- | --- | --- | --- | --- | --- | --- |
| | L | H | | | 1 P.V. | 1.5 P.V. | 2.0 P.V. |
| LN-HN | 2.5 | 2.5 | 0.5 | 25.0 | 7.0 | 1.5 | 1.5 |
| LN-HS | 3.75 | 1.25 | 0.7 | 24.5 | 24.5 | 5.0 | 1.0 |
| LS-HN | 1.25 | 3.75 | 0.2 | 25.0 | 1.25 | 1.25 | 1.25 |
| LS-HS | 2.0 | 3.0 | 0.3 | 28.2 | 12.5 | 0.5 | 0.2 |
| N(430) | 5.0 | | 0.3 | 24.5 | 2.0 | 1.25 | 0.25 |
| N(470) | 5.0 | | 0.1 | 25.2 | 5.0 | 2.5 | 2.0 |

I claim as my invention:

1. An improvement in waterproofing operations for recovering oil from subterranean reservoirs involving the injection of aqueous liquid through at least one injection borehole penetrating said reservoir, forcing said aqueous liquid into said reservoir through said injection borehole, and recovering oil displaced from said reservoir by said aqueous liquid at a location spaced from said injection borehole, said improvement comprising incorporating in at least the initial portion of said aqueous liquid a composition containing both low molecular weight alkyl aryl sulfonates which are water soluble and high molecular weight alkyl aryl sulfonates which are water insoluble, said low molecular weight alkyl aryl sulfonates being present in at least critical micelle concentration with amphiphilic molecules comprising said high molecular weight alkyl aryl sulfonates penetrating into and swelling the micelles, whereby the interfacial tension between said portion of said aqueous liquid containing said mixture and the residual oil in said reservoir is substantially reduced enabling said portion to displace said oil from said reservoir with greater efficiency.

2. The improvement according to claim 1 wherein both the low molecular weight alkyl aryl sulfonates and the high molecular weight alkyl aryl sulfonates are alkali metal salts of said sulfonates.

3. The improvement according to claim 1 wherein the portion of the aqueous liquid containing the low molecular weight alkyl aryl sulfonates and high molecular weight alkyl aryl sulfonates has an electrolyte present in concentrations from 0.05 to 0.7 molar.

4. The improvement according to claim 3 wherein the salt is sodium chloride.

5. The improvement according to claim 1 wherein the low molecular weight alkyl aryl sulfonates have an average molecular weight from 300 to 400 and the high molecular weight alkyl aryl sulfonates have an average molecular weight from 400 to 600.

6. The improvement according to claim 1 wherein both the low molecular weight alkyl aryl sulfonates and the high molecular weight alkyl aryl sulfonates are the sodium salts of natural petroleum sulfonates.

7. The improvement according to claim 6 wherein the composition of the low molecular weight alkyl aryl sulfonates and the high molecular weight alkyl aryl sulfonates contain from 15 to 40% by weight of mineral oil.

8. The improvement according to claim 1 wherein the portion of said aqueous liquid containing the low molecular weight alkyl aryl sulfonates and the high molecular weigh alkyl aryl sulfonates constitutes at least 5% of the pore volume of the portion of the reservoir to be treated by the waterflooding operation.

9. The improvement according to claim 1 wherein the composition of the alkyl aryl sulfonates is a mixture of the sodium salts of natural petroleum sulfonates having an average molecular weight of from about 400 to 500 which is obtained from sulfonating petroleum fractions.

10. An improvement in waterflooding operations for recovering oil from subterranean reservoirs involving the injection of aqueous liquid through at least one injection borehole penetrating said reservoir, forcing said aqueous liquid into said reservoir through said injection borehole and recovering oil displaced from said reservoir by said aqueous liquid at a location spaced from said injection borehole, said improvement comprising incorporating in at least the initial portion of said aqueous liquid containing an electrolyte and from 0.05 to 10 percent by weight of a composition composed of low molecular weight alkyl aryl sulfonates having a molecular weight from 300 to 400 and high molecular weight alkyl aryl sulfonates having a molecular weight from 400 to 600, said low molecular weight alkyl aryl sulfonates being present in at least the critical micelle concentration which solubilizes said high molecular weight alkyl aryl sulfonates and swells the micelles in said portion thereby effecting a reduction in the interfacial tension between said portion of said aqueous liquid containing said composition and the oil in said reservoir and enabling said portion to displace said oil with greater efficiency.

11. The improvement according to claim 10 wherein the portion of the aqueous liquid containig the composition of the high and low molecular weight alkyl aryl sulfonates contains sodium chloride in a concentration from .05 to .7 molar depending on temperature which lowers the interfacial tension between said portion of said aqueous liquid containing said composition of said high and low molecular weight alkyl aryl sulfonates and the residual oil in the reservoir to less than .01 dyne per centimeter.

12. The improvement according to claim 11 wherein the composition of high and low molecular weight alkyl aryl sulfonates is commercially available, natural petroleum sulfonates which are mahogany sulfonates that have average molecular weights from 400 to 500 and are marketed in the form of dispersions in from 15 to 40% by weight of mineral oil.

13. An improved aqueous oil-displacing medium suitably displacing oil from underground oil-producing reservoirs when injected therein, comprising:
 (a) from 90 to 99.95% by weight of water having an electrolyte concentration from .05 molar to 0.7 molar; and
 (b) from .05 to 10% by weight of a composition including alkyl aryl sulfonates having an average molecular weight from 300 to 400, and alkyl aryl sulfonates having an average molecular weight from 400 to 600 said 300–400 molecular weight sulfonates being present in at least critical micelle concentrations.

14. The oil-displacing medium according to claim 13 in which the alkyl aryl sulfonates are sodium salts.

15. The oil-displacing medium according to claim 13 wherein the composition of alkyl aryl sulfonates includes from 15 to 40% by weight of mineral oil.

16. The oil-displacing medium according to claim 13 wherein the alkyl aryl sulfonates having an average molecular weight from 400 to 600 are mixtures of natural petroleum sulfonates.

17. The oil-displacing medium according to claim 13 wherein the composition of alkyl aryl sulfonates is commercially available mahogany sulfonates having an average molecular weight from about 400 to about 500.

18. In a waterflooding operation for recovering oil from a subterranean reservoir, the improvement which comprises:
 incorporating in at least the initial portion of the flood water a composition of alkyl aryl sulfonates in which at least one surface active alkyl aryl sulfonate that is water soluble and is present in an amount exceeding its critical micelle concentration in the flood water is mixed with at least one surface active alkyl aryl sulfonate that is relatively water insoluble, said water soluble sulfonate being an alkali metal salt of a green acid sludge sulfonate; and
 incorporating in said sulfonate containing flood water from about 0.05 to 0.7 moles per liter of an electrolyte.

References Cited

UNITED STATES PATENTS

| | | | |
|---|---|---|---|
| 3,096,820 | 7/1963 | Bernard | 166—9 |
| 3,126,952 | 3/1964 | Jones | 166—9 |
| 3,170,514 | 2/1965 | Harvey et al. | 166—9 |
| 3,288,213 | 11/1966 | King et al. | 166—9 |
| 3,297,084 | 1/1967 | Gogarty et al. | 166—9 |
| 3,302,713 | 2/1967 | Ahearn et al. | 166—9 |

ERNEST R. PURSER, *Primary Examiner.*

STEPHEN J. NOVOSAD, *Examiner.*